United States Patent
Urata

(10) Patent No.: US 7,486,597 B2
(45) Date of Patent: Feb. 3, 2009

(54) PICK-UP ANGLE ADJUSTMENT MECHANISM FOR OPTICAL DISK APPARATUS

(75) Inventor: Kazuo Urata, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 607 days.

(21) Appl. No.: 11/291,909

(22) Filed: Dec. 2, 2005

(65) Prior Publication Data

US 2006/0123439 A1    Jun. 8, 2006

(30) Foreign Application Priority Data

Dec. 3, 2004    (JP) ............................. 2004-350839

(51) Int. Cl.
*G11B 7/00*    (2006.01)
(52) U.S. Cl. ............... 369/44.32; 369/44.14; 369/53.19
(58) Field of Classification Search ........................ None
See application file for complete search history.

(56) References Cited

U.S. PATENT DOCUMENTS

| 6,285,649 | B1 | 9/2001 | Bessho et al. | |
|---|---|---|---|---|
| 2002/0039337 | A1 | 4/2002 | Seto | |
| 2004/0028394 | A1* | 2/2004 | Park et al. | 386/125 |
| 2005/0132393 | A1* | 6/2005 | Omori et al. | 720/669 |

FOREIGN PATENT DOCUMENTS

| EP | 0 978 825 A1 | 2/2000 |
|---|---|---|
| JP | 9320214 A | 12/1997 |
| JP | 10-64096 A | 3/1998 |
| JP | 10-143870 A | 5/1998 |

(Continued)

OTHER PUBLICATIONS

Japanese Office Action dated Feb. 19, 2008 with English translation of relevant portions (Four (4) pages).

(Continued)

*Primary Examiner*—Muhammad N. Edun
(74) *Attorney, Agent, or Firm*—Crowell & Moring LLP

(57) ABSTRACT

A pick-up angle adjustment apparatus in provided for adjusting an angle of an optical pick-up mounted in an optical disk apparatus. In the pick-up angle adjustment apparatus, a first guide shaft has a first length between a pair of ends thereof for guiding and supporting the optical pick-up. A second guide shaft has a second length between a pair of ends thereof for guiding and supporting the optical pick-up. A first adjustment member is operable for vertically moving one end of the first guide shaft so as to adjust the angle of the optical pick-up. The first adjustment member is capable of moving the one end of the first guide shaft by a first distance when the first adjustment member is operated by a given operation amount. A second adjustment member is operable for vertically moving one end of the second guide shaft so as to adjust the angle of the optical pick-up. The second adjustment member is capable of moving the one end of the second guide shaft by a second distance when the second adjustment member is operated by the same operation amount as applied to the first adjustment member. A distance ratio of the first distance and the second distance is set equal to a length ratio of the first length and the second length.

10 Claims, 4 Drawing Sheets

FOREIGN PATENT DOCUMENTS

| | | |
|---|---|---|
| JP | 2000-20962 A | 1/2000 |
| JP | 2001-344766 A | 12/2001 |
| JP | 2001-351251 A | 12/2001 |
| JP | 2002-170248 A | 6/2002 |
| JP | 2002-288861 A | 10/2002 |
| JP | 2003-187538 A | 7/2003 |
| JP | 2005-293709 A | 10/2005 |

OTHER PUBLICATIONS

European Search Report dated Jun. 2, 2006 (Five (5) pages).

* cited by examiner $$\frac{PA}{PB} = \frac{L1}{L2}$$

PICK-UP ANGLE ADJUSTMENT MECHANISM FOR OPTICAL DISK APPARATUS

BACKGROUND OF THE INVENTION

1. Technical Field

The present invention relates to a pick-up angle adjustment mechanism for optical disk apparatus.

2. Related Art

Conventionally, an optical disk apparatus such as an optical disk recording and reproducing apparatus is provided with a pick-up angle adjustment mechanism for adjusting the laser light emitted from an optical head so that the optical axis of the laser light becomes perpendicular to a recording surface of on optical disk.

FIG. 3 shows the configuration of a conventional pick-up angle adjustment mechanism for optical disk apparatus.

In FIG. 3, reference numeral 31 denotes a chassis; 32 denotes a spindle motor to rotate an optical disk; 33 denotes a turntable for mounting an optical disk; 34 denotes an optical pick-up; 35 denotes an optical head attached to the optical pick-up 34; 36 denotes a first guide shaft (A-shaft); and 37 denotes a second guide shaft (B-shaft). The optical pick-up 34 is connected to the A-shaft 36 and the B-shaft 37. By means of a drive means (not shown), the optical pick-up 34 is capable of reciprocating along the A-shaft 36 and the B-shaft 37 in the radial direction (R direction) of an optical disk.

A support member 38 supports an end A-1 of the A-shaft 36 toward the turntable 33 on the chassis 31. An adjustment member 39 supports the other end A-2. Adjustment members 40 and 41 are provided for both ends B-1 and B-2 of the B-shaft 37. The support member 38 supports the end A-1 of the A-shaft 36 to maintain a fixed height of the end A-1. The adjustment members 39 through 41 are used to adjust heights (a position perpendicular to the chassis 31) of the end A-2 of the A-shaft 36 and the ends B-1 and B-2 of the B-shaft 37. In this manner, a tilt of the optical pick-up 34 can be adjusted. It is possible to adjust a tilt angle (a tilt between the optical head's optical axis and the optical disk's recording surface) of the laser light radiated from the optical head 35.

Conventionally, there have been proposed various arrangements for the adjustment members 39 through 41.

For example, patent document 1 (Japanese Patent Application Laid-Open Publication 2003-187538) describes the guide shaft adjustment means composed of the adjustment plate, the elasticity means, and the adjustment screw as follows. The adjustment plate supports one end of the guide shaft and is rotatable around the other end in the direction approximately perpendicular to the optical disk surface. The elasticity means applies elasticity to the guide shaft and the adjustment plate in the direction approximately perpendicular to the optical disk surface. The adjustment screw is screwed into the adjustment plate. The tip of the adjustment screw touches the base to displace the guide shaft and the adjustment plate in the direction approximately perpendicular to the optical disk surface against the elasticity applied by the elasticity means.

Patent document 2 (Japanese Patent Application Laid-Open Publication 2002-170248) proposes the height adjustment mechanism provided with the adjustment screw that is threadably mounted on the spring and the chassis to support the guide shaft from the bottom. The spring presses to apply force to the end of the guide shaft from the top.

Patent document 3 (Japanese Patent Application Laid-Open Publication 2000-020962) proposes the height direction adjustment mechanism having the spring member and the locking member. The spring member always presses the end of the guide shaft upward in the direction orthogonal to the chassis. The locking member shows a T-shaped sectional view and has a disk portion that resists the spring member to prevent the end of the guide shaft from being raised over the chassis.

Patent document 4 (Japanese Patent Application Laid-Open Publication 10-143870) proposes the adjustment mechanism that is configured as follows. The adjustment screw is rotated to finely move horizontally and to vertically change the height of the guide shaft supported at the tapered portion of the adjustment screw.

Patent document 5 (Japanese Patent Application Laid-Open Publication 09-S20214) proposes the adjustment member using the cam as the bearing for the guide shaft.

Patent document 6 (Japanese Patent Application Laid-Open Publication 2001-344766) proposes the following adjustment mechanism. The adjustment mechanism uses the adjustment block having a long hole slanted at a specified angle. The end of the guide shaft is inserted into this long hole. The position of the adjustment block is moved to adjust the height of the guide shaft end.

Patent documents 7 (Japanese Patent Application Laid-Open Publication 10-064096) and 8 (Japanese Patent Application Laid-Open Publication 2002-288861) propose the position adjustment members using eccentric cams.

[Patent document 1] Japanese Patent Application Laid-Open Publication 2003-187538

[Patent document 2] Japanese Patent Application Laid-Open Publication 2002-170248

[Patent document 3] Japanese Patent Application Laid-Open Publication 2000-020962

[Patent document 4] Japanese Patent Application Laid-Open Publication 10-143870

[Patent document 5] Japanese Patent Application Laid-Open Publication 09-320214

[Patent document 6] Japanese Patent Application Laid-Open Publication 2001-344766

[Patent document 7] Japanese Patent Application Laid-Open Publication 10-064096

[Patent document 8] Japanese Patent Application Laid-Open Publication 2002-288861

Let us consider a case of using the position adjustment member to adjust slants of two guide shafts that guide and support the optical pick-up as mentioned above. When the same adjustment amount is applied to each position adjustment member, the respective ends of the respective guide shafts move at the same vertical distance. However, if the lengths of the guide shafts are different, angles and levels vary between the pair of the guide shafts, which might make difficult the angle adjustment work of the optical pick-up. In the prior art, the pair of the guide shafts have the same length for avoiding the difficulty and complicated adjustment work. The prior art requires shaft lengths to be the same, necessitating an unnecessary space.

SUMMARY OF THE INVENTION

It is therefore an object of the present invention to provide a pick-up angle adjustment mechanism for optical disk apparatus easily capable of adjusting an optical pick-up angle even when two guide shafts have different lengths.

To achieve the above-mentioned object, an inventive pick-up angle adjustment apparatus is designed for adjusting an angle of an optical pick-up mounted in an optical disk apparatus. The inventive pick-up angle adjustment apparatus comprises: a first guide shaft that has a first length between a pair of ends thereof for guiding and supporting the optical pick-up; a second guide shaft that has a second length between a pair of ends thereof for guiding and supporting the optical pick-up, the second length being different from the first length; a first adjustment member that is operable for vertically moving one end of the first guide shaft so as to adjust the angle of the optical pick-up, the first adjustment member being capable of moving the one end of the first guide shaft by a first distance when the first adjustment member is operated by a given operation amount; and a second adjustment member that is operable for vertically moving one end of the second guide shaft so as to adjust the angle of the optical pick-up, the second adjustment member being capable of moving the one end of the second guide shaft by a second distance when the second adjustment member is operated by the same operation amount as applied to the first adjustment member, wherein a distance ratio of the first distance and the second distance is set equal to a length ratio of the first length and the second length.

In a preferred form, the first adjustment member comprises a first adjustment screw that has a first pitch and is rotatable for vertically moving one end of the first guide shaft in proportion to the first pitch, the first adjustment screw being capable of moving the one end of the first guide shaft by the first distance when the first adjustment screw is rotated by a given rotational operation amount, and the second adjustment member comprises a second adjustment screw that has a second pitch and is rotatable for vertically moving one end of the second guide shaft in proportion to the second pitch, the second adjustment screw being capable of moving the one end of the second guide shaft by the second distance when the second adjustment screw is rotated by the same rotational operation amount as applied to the first adjustment screw, wherein a pitch ratio of the first pitch and the second pith is set equal to the distance ratio and therefore equal to the length ratio.

In another preferred form, the first adjustment member comprises a first adjustment cam that is rotatable for converting a rotational movement thereof into a vertical movement of one end of the first guide shaft by a first conversion rate, the first adjustment cam being capable of moving the one end of the first guide shaft by the first distance when the first adjustment cam is rotated by a given rotational operation amount, and the second adjustment member comprises a second adjustment cam that is rotatable for converting a rotational movement thereof into a vertical movement of one end of the second guide shaft by a second conversion rate, the second adjustment cam being capable of moving the one end of the second guide shaft by the second distance when the second adjustment cam is rotated by the same rotational operation amount as applied to the first adjustment cam, wherein a conversion ratio of the first conversion rate and the second conversion rate is set equal to the distance ratio and therefore equal to the length ratio.

In a further preferred form, the first adjustment member comprises a first adjustment slider that has a first slanted hole for receiving therein one end of the first guide shaft and that is slidable for vertically moving the one end of the first guide shaft along the first slanted hole, the first adjustment slider being capable of moving the one end of the first guide shaft by the first distance when the first adjustment slider is slid by a given slide operation amount, and the second adjustment member comprises a second adjustment slider that has a second slanted hole for receiving therein one end of the second guide shaft and that is slidable for vertically moving the one end of the second guide shaft along the second slanted hole, the second adjustment slider being capable of moving the one end of the second guide shaft by the second distance when the second adjustment slider is slid by the same slide operation amount as applied to the first adjustment slider, wherein a slant ratio of the first slanted hole and the second slanted hole is set equal to the distance ratio and therefore equal to the length ratio.

In a still further preferred form, the first adjustment member comprises a first adjustment holder that has a first span between a supporting point and a holding point for holding one end of the first guide shaft and that is swingable around the supporting point for vertically moving the one end of the first guide shaft at the holding point, the first adjustment holder being capable of moving the one end of the first guide shaft by the first distance when the first adjustment holder is swung by a given swing operation amount, and the second adjustment member comprises a second adjustment holder that has a second span between a supporting point and a holding point for holding one end of the second guide shaft and that is swingable around the supporting point for vertically moving the one end of the second guide shaft at the holding point, the second adjustment holder being capable of moving the one end of the second guide shaft by the second distance when the second adjustment holder is swung by the same swing operation amount as applied to the first adjustment holder, wherein a span ratio of the first span of the first adjustment holder and the second span of the second adjustment holder is set equal to the distance ratio and therefore equal to the length ratio.

In accordance with the pick-up angle adjustment mechanism for optical disk apparatus according to the present invention, operating the adjustment member by a specified amount causes a ratio of the distance at the end of the first guide shaft to the distance at the end of the second guide shaft to be equal to a ratio of the length of the first guide shaft to the length of the second guide shaft. Even when the two guide shafts for guiding and supporting the optical pick-up have different lengths, operating the adjustment member by the same operation amount provides the same variation in a slant of each guide shaft. This makes it possible to easily adjust optical pick-up slant similarly to a case where guide shaft lengths are the same.

Since there is no need to configure the two guide shafts to be the same length, it is possible to provide an optimal guide shaft length, e.g., a minimum necessary length, and to achieve the space saving effect. There can be provided another advantage in terms of the rigidity.

BRIEF DESCRIPTION OF THE DRAWINGS

FIGS. 1(a), 1(b) and 1(c) are diagrams showing the configuration of a pick-up angle adjustment mechanism for optical disk apparatus according to a first embodiment of the present invention, wherein FIG. 1(a) is a perspective view; FIG. 1(b) shows the configuration of an adjustment member; and FIG. 1(c) shows the principle of operation of the adjustment member.

FIGS. 2(a), 2(b) and 2(c) are diagrams showing the pick-up angle adjustment mechanism for optical disk apparatus according to other embodiments of the present invention, wherein FIG. 2(a) shows the use of adjustment screws with tapered portions; FIG. 2(b) shows the use of cams; and FIG. 2(c) shows the use of an adjustment slider.

DETAILED DESCRIPTION OF THE INVENTION

Figure 4:
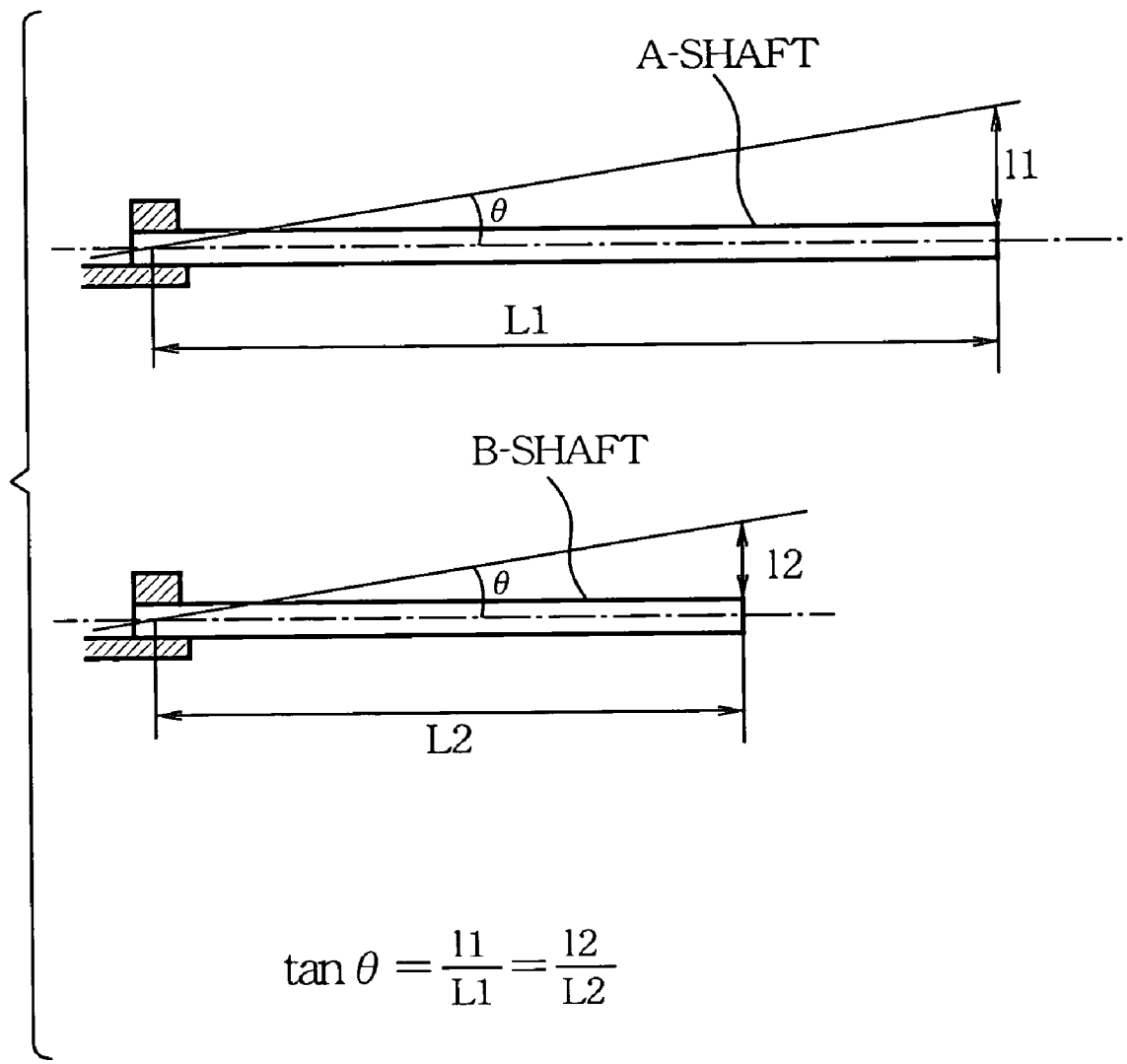
FIG. 4 is a diagram showing adjustment of an angle of two guide shafts with different lengths.

FIG. 4 illustrates adjustment of an angle of two guide shafts with different lengths. As shown in FIG. 4, length L1 of the A-shaft differs from length L2 of the B-shaft (L1>L2 in the illustrated example). When each shaft is rotated for angle θ within a vertical plane, the height changes for 11 at the end of the A-shaft. On the other hand, the height changes for 12 at the end of the B-shaft 7 (11>12). To rotate the A-shaft and the B-shaft with different length for the same angle θ, it is necessary to move the end of the A-shaft by distance 11 and the end of the B-shaft by distance 12.

When a screw is used for the adjustment member that adjusts the height of the guide shaft at the end, for example, one rotation of the screw causes the same displacement along the vertical direction. As mentioned above, however, the angle variation with reference to the level varies with different shaft lengths. To manually adjust the optical pick-up's slant, the adjustment can be facilitated when the screw's same rotation angle causes the same variation of guide shaft slants (angles) between the two shafts. This also applies to an adjustment member that uses anything other than the adjustment screw. To satisfy this condition, the prior art requires shaft lengths to be the same, necessitating an unnecessary space.

Figure 1:
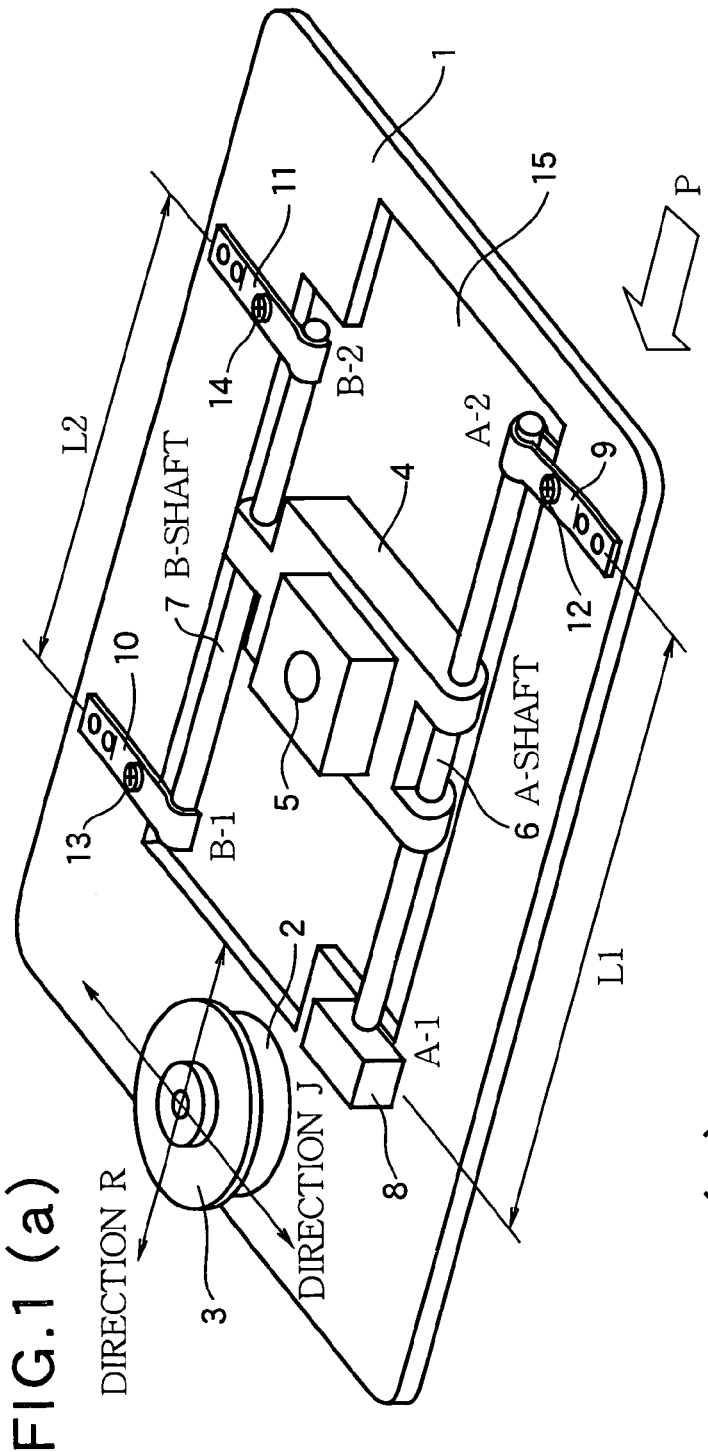
Figure 1:
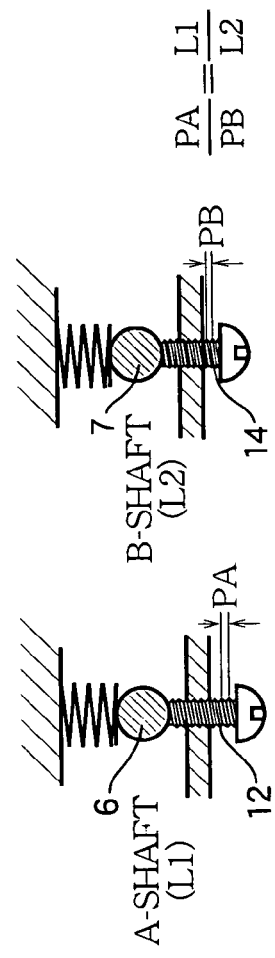
Figure 1:
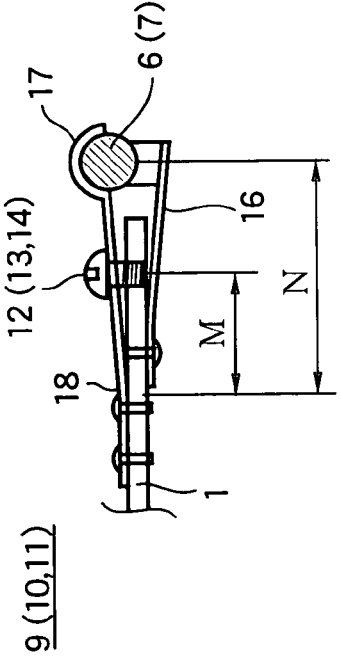

It is therefore an object of the present invention to provide a pick-up angle adjustment mechanism for optical disk apparatus easily capable of adjusting an optical pick-up angle even when two guide shafts have different lengths. Now with reference to FIG. 1, the following describes a first embodiment of the pick-up angle adjustment mechanism for optical disk apparatus according to the present invention. FIG. 1(a) is a perspective view showing the configuration of a pick-up angle adjustment mechanism for optical disk apparatus according to an embodiment of the present invention. FIG. 1(b) is a partially sectional view showing the configuration of an adjustment member viewed from direction P in FIG. 1(a). FIG. 1(c) is a diagram showing the principle of operation of the adjustment member.

In FIG. 1, reference numeral 1 denotes a chassis; 2 denotes a spindle motor to rotate an optical disk; 3 denotes a turntable to mount an optical disk; 4 denotes an optical pick-up; 5 denotes an optical head; 6 denotes a first guide shaft (A-shaft); and 7 denotes a second guide shaft (B-shaft). According to the present invention, the length of the A-shaft 6 is represented as L1 and the length of the B-shaft 7 is represented as L2 (L1≠L2). The lengths of the two guide shafts differ from each other. As shown in FIG. 1, the optical pick-up 4 is connected to the A-shaft 6 and the B-shaft 7. Drive means (not shown) moves the optical pick-up 4 in the radial direction (direction R in FIG. 1) of the optical disk along the A-shaft 6 and the B-shaft 7. The support member 8 supports an end A-1 of the A-shaft 6 toward the turntable 3 and maintains a fixed height. The adjustment member 9 supports the other end A-2 of the A-shaft 6. The adjustment members 10 and 11 support an end B-1 toward the turntable 3 and the other end B-2 of the B-shaft 7, respectively. The adjustment members 9, 10, and 11 are provided with adjustment screws 12, 13, and 14. Rotating the adjustment screws 12 through 14 can change vertical positions, i.e., heights of the corresponding guide shafts' ends along a vertical direction (a direction perpendicular to the chassis 1).

FIG. 1(b) shows the configuration of the adjustment member 9 and is provided as a partially sectional view viewed from the direction P in FIG. 1(a). The adjustment members 10 and 11 are also configured similarly to the adjustment member 9.

In FIG. 1(b), reference numeral 16 denotes a spring member. The spring member 16 is attached to the bottom of the chassis 1 and always presses upward the first guide shaft (A-shaft) 6 disposed at an aperture 15 of the chassis 1. Reference numeral 17 denotes a presser foot. The presser foot 17 is attached to the top surface of the chassis 1 and touches the top surface of the A-shaft 6 to prevent it from being pressed to rise. As shown in FIG. 1(b), there is provided a through-hole approximately at the center of the presser foot 17 for an adjustment screw 12 that is screwed to the chassis. The head of the adjustment screw 12 touches the presser foot 17 to regulate its upward turn around a point 18 (a position where the presser foot 17 is fixed to the chassis 1) as a supporting point.

In this manner, the spring member 16 and the presser foot are used to hold the first guide shaft 6. Adjusting the adjustment screw 12 can adjust the vertical position of the A-shaft 6.

Similarly, the adjustment members 10 and 11 can adjust vertical positions of the second guide shaft (B-shaft) 7 by adjusting the adjustment screw 13 and 14.

As mentioned above, the embodiment uses the adjustment member for a shaft holding member to hold the guide shaft.

The pick-up angle adjustment mechanism for optical disk apparatus is configured as mentioned above and is used to adjust an angle of the optical pick-up 4 according to the following steps.

(1) Move the optical pick-up 4 to an innermost position (toward the turntable 3).

(2) Adjust the adjustment screw 13 of the adjustment member 10 provided at the end B-1 of the B-shaft 7 toward an inside periphery so that the optical pick-up 4 is made parallel to the optical disk surface in direction J (a direction on the optical disk surface orthogonal to the direction R) in FIG. 1.

(3) Move the optical pick-up 4 to an outmost periphery of the optical disk.

(4) Adjust the adjustment screw 14 of the adjustment member 11 provided at the end B-2 of the B-shaft 7 toward an outside periphery so that the optical pick-up 4 is made parallel to the optical disk surface in the direction J.

(5) Adjust the adjustment screw 12 of the adjustment member 9 provided at the end A-2 of the A-shaft 6 toward an outside periphery and the adjustment screw 14 of the adjustment member 11 provided at the end B-2 of the B-shaft 7 toward an outside periphery so that the optical pick-up 4 is made parallel to the optical disk surface in the direction R.

According to the present invention, as mentioned above, the length L1 of the A-shaft 6 differs from the length L2 of the B-shaft 7 (L1≠L2). The above-mentioned step (5) is performed to adjust slants of the A-shaft 6 and the B-shaft 7 having different lengths.

According to the present invention, the adjustment member 9 adjusts the height of the A-shaft's end. The adjustment member 11 adjusts the height of the B-shaft's end. The adjustment members 9 and 11 are used so that the same operation amount causes a variation of the height at each guide shaft end to correspond to the length of each shaft. The present invention aims at causing the same variation in rotation angles of the A-shaft and the B-shaft within the vertical plane, i.e., the same variation in the angles represented by θ in FIG. 4.

Namely, the inventive pick-up angle adjustment apparatus is designed for adjusting an angle θ of an optical pick-up 4 mounted in an optical disk apparatus. In the inventive pick-up angle adjustment apparatus, a first guide shaft 6 has a first length L1 between a pair of ends A-1 and A-2 for guiding and supporting the optical pick-up 4. A second guide shaft 7 has a second length L2 between a pair of ends B-1 and B-2 for guiding and supporting the optical pick-up 4. The second length L2 is different from the first length L1. A first adjustment member 9 is operable for vertically moving one end A-2 of the first guide shaft 6 so as to adjust the angle θ of the optical pick-up 4. The first adjustment member 9 is capable of moving the one end A-2 of the first guide shaft 6 by a first distance 11 when the first adjustment member 9 is operated by a given operation amount. A second adjustment member 11 is operable for vertically moving one end B-2 of the second guide shaft 7 so as to adjust the angle θ of the optical pick-up 4. The second adjustment member 11 is capable of moving the one end B-2 of the second guide shaft 7 by a second distance 12 when the second adjustment member 11 is operated by the same operation amount as applied to the first adjustment member 9. A distance ratio 11/12 of the first distance 11 and the second distance 12 is set equal to a length ratio L1/L2 of the first length L1 and the second length L2.

The one end A-2 of the first guide shaft 6 is staggered from the one end B-2 of the second guide shaft 7, while the other end A-1 of the first guide shaft 6 is aligned to the other end B-1 of the second guide shaft 7. The first guide shaft 6 and the second guide shaft 7 are mounted in parallel to each other for guiding the optical pick-up 4 along the length L of the first guide shaft 6 and the second guide shaft 7. The first guide shaft 6 is pivotable around the other end A-1 so that the one end A-2 is vertically movable, and the second guide shaft 7 is pivotable around the other end B-1 so that the one end B-2 is vertically movable. The same operation amount enables the first adjustment member 9 to vertically move the one end A-2 of the first guide shaft 6 by the first distance 11 and enables the second adjustment member 11 to vertically move the one end B-2 of the second guide shaft 7 by the second distance 12 in such a manner that the first guide shaft 6 and the second guide shaft 7 are kept in parallel to each other while the angle θ of the optical pick-up 4 is adjusted.

As shown in FIG. 1(c), the embodiment provides different pitches for the adjustment screw 12 and the adjustment screw 14. The adjustment screw 12 is used for the adjustment member 9 that adjusts the height of the end A-2 for the A-shaft 6. The adjustment screw 14 is used for the adjustment member 11 that adjusts the height of the end B-2 for the A-shaft 6. The adjustment screw 12 has pitch PA. The adjustment screw 14 has pitch PB. A ratio of pitch PA to pitch PB is configured to be equal to a ratio of the A-shaft length to the B-shaft length (L1/L2), i.e., PA/PB=L1/L2.

Namely in this embodiment, the first adjustment member 9 comprises a first adjustment screw 12 that has a first pitch PA and is rotatable for vertically moving one end A-2 of the first guide shaft 6 in proportion to the first pitch PA. The first adjustment screw 12 is capable of moving the one end A-2 of the first guide shaft 6 by the first distance 11 when the first adjustment screw 12 is rotated by a given rotational operation amount. The second adjustment member 11 comprises a second adjustment screw 14 that has a second pitch PB and is rotatable for vertically moving one end B-2 of the second guide shaft 7 in proportion to the second pitch PB. The second adjustment screw 14 is capable of moving the one end B-2 of the second guide shaft 7 by the second distance 12 when the second adjustment screw 14 is rotated by the same rotational operation amount as applied to the first adjustment screw 12. A pitch ratio PA/PB of the first pitch PA and the second pith PB is set equal to the distance ratio 11/12 and therefore equal to the length ratio L1/L2.

At step (5) above, the adjustment member 9 and the adjustment member 11 are used to adjust the optical pick-up 4 so that it becomes parallel to the optical disk surface in the direction R. In this case, it is possible to adjust angles of the A-shaft and the B-shaft against the level with the same manual operation amount. That is, the end A-2 of the A-shaft vertically moves in accordance with the amount of rotating the adjustment screw 12 of the adjustment member 9.

Similarly, the end B-2 of the B-shaft vertically moves in accordance with the amount of rotating the adjustment screw 14 of the adjustment member 11. A distance for the end A-2 is equivalent to an angle variation of the A-shaft against the level (a variation of the rotation angle within the vertical plane). A distance for the end B-2 is equivalent to an angle variation of the B-shaft against the level. Since the adjustment screws 12 and 14 use different pitches, it is possible to provide the same angle variation for the A-shaft and the B-shaft. This makes it possible to adjust angles of the A-shaft and the B-shaft against the level with the same manipulation feeling. Even when the A-shaft and the B-shaft have different lengths, the adjustment at step (5) above can be performed easily.

While there has been described changing pitches for the adjustment screws, a different arrangement may be used to provide a constant variation for slanting angles caused by the A-shaft and the B-shaft.

For example, the same working effect can result by providing the adjustment member 9 for the A-shaft and the adjustment members 10 and 11 for the B-shaft with the same adjustment screw pitch and different lengths of the presser foot 17.

Let us assume distance M from the supporting point 18 for swinging on the presser foot 17 to the adjustment screw 12 or 14 of the adjustment member 9 or 11 that is configured as shown in FIG. 1(b). Further, let us assume distance NA from point 18 on the adjustment member 9 to the center of a portion in contact with the guide shaft 6. Let us assume distance NB from point 18 on the adjustment member 11 to the center of a portion in contact with the guide shaft 7.

In this case, let us assume that distance M from the point 18 on each adjustment member to the adjustment screw be constant. When there is considered a ratio (NA/NB) of the lengths to the centers of the portions in contact with the guide shafts, the ratio (NA/NB) is configured to be equal to a ratio (L1/L2) of the A-shaft and B-shaft lengths (NA/NB=L1/L2).

Namely in this embodiment, the first adjustment member 9 comprises a first adjustment holder in the form of a presser foot 17 that has a first span NA between a supporting point 18 and a holding point for holding one end A-2 of the first guide shaft 6 and that is swingable around the supporting point 18 for vertically moving the one end A-2 of the first guide shaft 6 at the holding point. The first adjustment holder 17 is capable of moving the one end A-2 of the first guide shaft 6 by the first distance 11 when the first adjustment holder 17 is swung by a given swing operation amount. The second adjustment member 11 comprises a second adjustment holder in the form of another presser foot 17 that has a second span NB between a supporting point and a holding point for holding one end B-2 of the second guide shaft 7 and that is swingable around the supporting point for vertically moving the one end B-2 of the second guide shaft 7 at the holding point. The second adjustment holder is capable of moving the one end B-2 of the second guide shaft 7 by the second distance 12 when the second adjustment holder is swung by the same swing operation amount as applied to the first adjustment holder. A span ratio NA/NB of the first span NA of the first adjustment holder and the second span NB of the second adjustment holder is set equal to the distance ratio 11/12 and therefore equal to the length ratio L1/L2. Also in this embodiment, rotating the adjustment screws 12 and 14 for the same angular amount creates the same swing operation amount, which causes the vertical distances at the ends of the guide shafts 6 and 7 to correspond to the respective shaft lengths. Each shaft produces the same rotation angle θ and the like within the vertical plane, making the adjustment easy.

The above-mentioned embodiments are capable of providing a thin structure by forming the aperture 15 for the chassis 1, disposing the guide shafts 6 and 7 and the optical pick-up 4 in the aperture 15, and using the adjustment members 9, 10, and 11 configured as shown in FIG. 1 (*b*). However, the configuration of the adjustment member is not limited thereto. When using the adjustment screws for the adjustment members as described in patent documents 1 through 3, the pitch of each adjustment screw just needs to be proportional to the length of the corresponding guide shaft as mentioned above.

It is preferable that the adjustment member 10 also generates the same variation corresponding to the operation amount as that for the adjustment member 11. In this case, it is possible to vertically and parallel move the guide shaft B by adjusting both ends with the same manipulation feeling.

Figure 2:
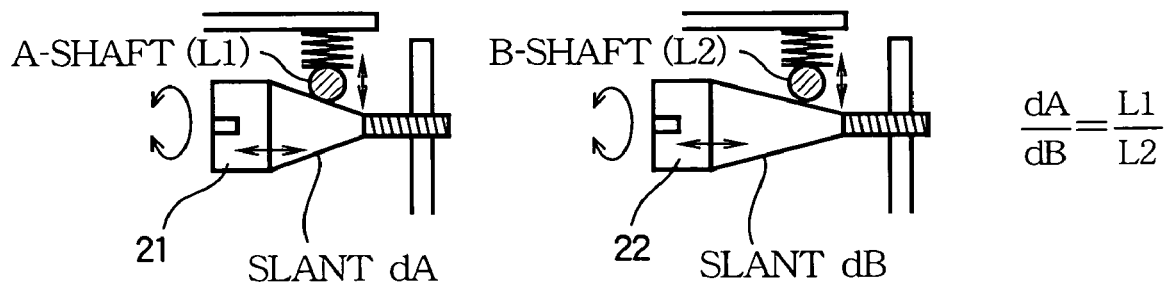
Figure 2:
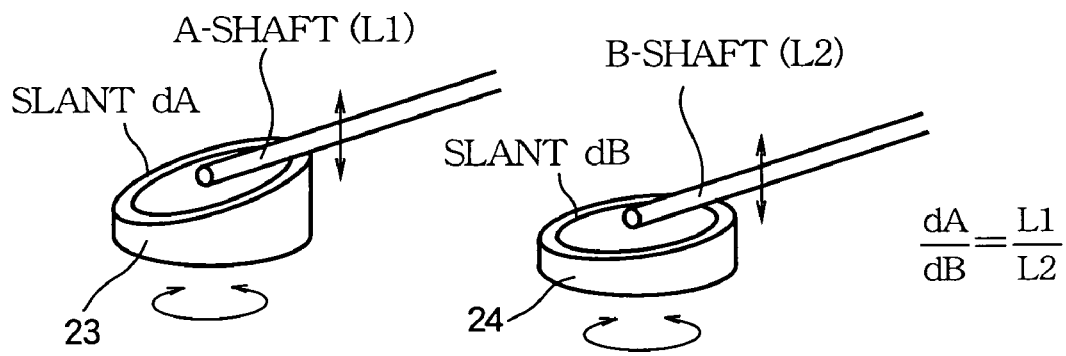
Figure 2:
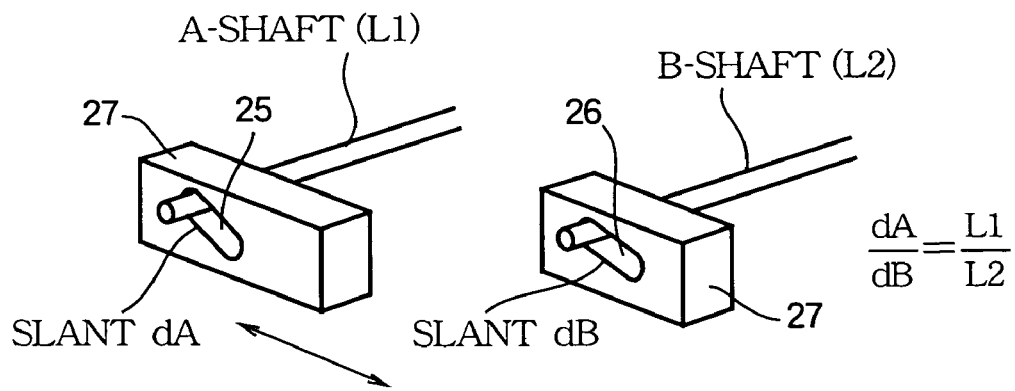
Figure 3:
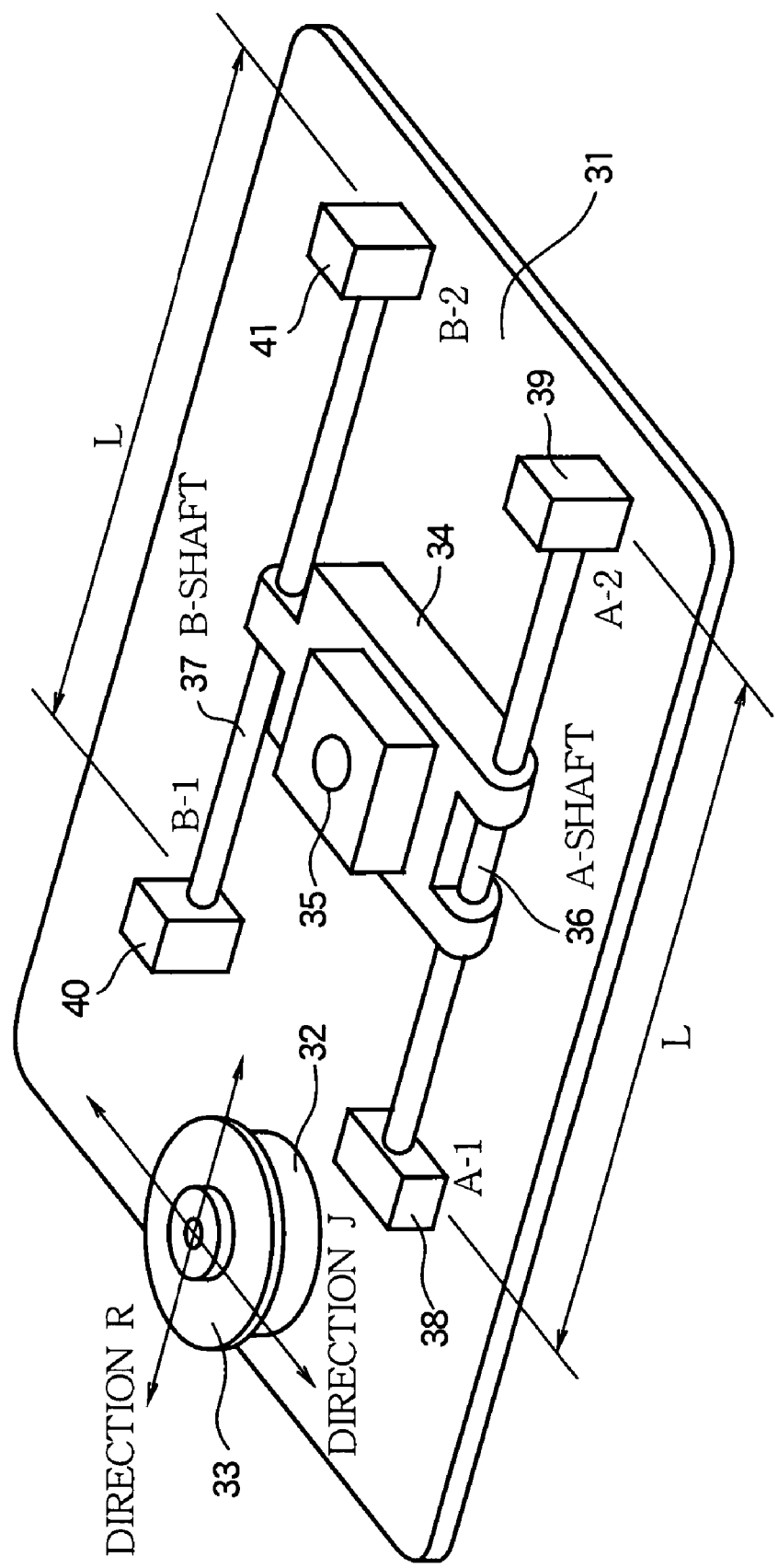
FIG. 3 is a diagram showing a conventional pick-up angle adjustment mechanism for optical disk apparatus.

FIG. 2 shows other embodiments. FIG. 2(*a*) shows the embodiment of adjusting vertical positions of the guide shaft end using a tapered portion provided for the adjustment screw similarly to that described in patent document 4 as mentioned above. FIG. 2(*b*) shows the embodiment of adjusting vertical positions of the guide shaft end using a cam similarly to that described in patent document 5 as mentioned above. FIG. 2(*c*) shows the embodiment of adjusting vertical positions of the guide shaft end using an adjustment mechanism having a long slant hole (cam hole) formed at a specified angle for inserting the guide shaft similarly to that described in patent document 6 as mentioned above.

As shown in FIG. 2(*a*), the tapered portion provided for the adjustment screw is used to adjust vertical positions of the guide shaft end. In this case, slant dA is found from the tapered portion of an adjustment screw 21 in contact with the end of the A-shaft 6. Slant dB is found from the tapered portion of an adjustment screw 22 in contact with the end of the A-shaft 7. A ratio of these slants (dA/dB) is configured to be equal to a ratio of the length L1 of the A-shaft 6 to the length L2 of the A-shaft 7 (L1/L2).

Namely in this embodiment, the first adjustment member 21 has a tapered surface of a first angle dA for supporting one end A-2 of the first guide shaft 6, and is shiftable in a horizontal direction as indicated by arrows for vertically moving the one end A-2 of the first guide shaft 6 along the tapered surface. The first adjustment member 21 is capable of moving the one end A-2 of the first guide shaft 6 by the first distance 11 when the first adjustment member 21 is shifted by a given shift operation amount. The second adjustment member 22 has a tapered surface of a second angle dB for supporting one end B-2 of the second guide shaft 7, and is shiftable in a horizontal direction for vertically moving the one end B-2 of the second guide shaft 7 along the tapered surface. The second adjustment member 22 is capable of moving the one end B-2 of the second guide shaft 7 by the second distance 12 when the second adjustment member 22 is shifted by the same shift operation amount as applied to the first adjustment member 21. An angle ratio dA/dB of the first angle dA and the second angle dB is set equal to the distance ratio 11/12 and therefore equal to the length ratio L1/L2.

According to the embodiment, rotating the adjustment screws 21 and 22 for the same angular amount creates the same shift operation amount, which can generate the same rotation angle θ for the A-shaft 6 and the B-shaft 7 within the vertical plane.

As shown in FIG. 2(*b*), this embodiment uses cams. In this case, slant dA is found from a cam 23 used as a bearing at the end of the A-shaft 6. Slant dB is found from a cam 24 used as a bearing at the end of the A-shaft 7. A ratio of these slants (dA/dB) is configured to be equal to a ratio of the length L1 of the A-shaft 6 to the length L2 of the A-shaft 7 (L1/L2).

Namely in this embodiment, the first adjustment member comprises a first adjustment cam 23 that is rotatable for converting a rotational movement thereof into a vertical movement (as indicated by arrows) of one end A-2 of the first guide shaft 6 by a first conversion rate dA. The first adjustment cam 23 is capable of moving the one end A-2 of the first guide shaft 6 by the first distance 11 when the first adjustment cam 23 is rotated by a given rotational operation amount. The second adjustment member comprises a second adjustment cam 24 that is rotatable for converting a rotational movement thereof into a vertical movement of one end B-2 of the second guide shaft 7 by a second conversion rate dB. The second adjustment cam 24 is capable of moving the one end B-2 of the second guide shaft 7 by the second distance 12 when the second adjustment cam 24 is rotated by the same rotational operation amount as applied to the first adjustment cam 23. A conversion ratio dA/dB of the first conversion rate dA and the second conversion rate dB is set equal to the distance ratio 11/12 and therefore equal to the length ratio L1/L2.

According to the embodiment, rotating the cams 23 and 24 for the same angular operation amount can allow vertical distances of the A-shaft 6 and the B-shaft 7 at the ends correspond to a ratio of the lengths thereof, and can generate the same rotation angle θ for the A-shaft 6 and the B-shaft 7 within the vertical plane.

As shown in FIG. 2(*c*), this embodiment uses an adjustment member 27 provided with a slider. The slider has a long slant hole 25 to insert the end of the A-shaft 6 and a long slant hole 26 to insert the end of the B-shaft 7. In this case, slant dA is found from the long hole 25 to insert the A-shaft 6. Slant dB is found from the long hole 26 to insert the A-shaft 7. A ratio of these slants (dA/dB) is configured to be equal to a ratio of the length L1 of the A-shaft 6 to the length L2 of the A-shaft 7 (L1/L2).

Namely in this embodiment, the first adjustment member comprises a first adjustment slider 27 that has a first slanted hole 25 for receiving therein one end A-2 of the first guide shaft 6 and that is slidable for vertically moving the one end A-2 of the first guide shaft 6 along the first slanted hole 25. The first adjustment slider 27 is capable of moving the one end A-2 of the first guide shaft 6 by the first distance 11 when the first adjustment slider 27 is slid by a given slide operation amount. The second adjustment member comprises a second adjustment slider 27 that is preferably integral with the first adjustment slider 27 and has a second slanted hole 26 for receiving therein one end B-2 of the second guide shaft 7 and that is slidable for vertically moving the one end B-2 of the second guide shaft 7 along the second slanted hole 26. The second adjustment slider 26 is capable of moving the one end B-2 of the second guide shaft 7 by the second distance 12 when the second adjustment slider 27 is slid by the same slide operation amount as applied to the first adjustment slider 27. A slant ratio dA/dB of the first slanted hole 25 and the second slanted hole 26 is set equal to the distance ratio 11/12 and therefore equal to the length ratio L1/L2.

According to the embodiment, moving the adjustment member 27 in the direction of an arrow as shown in FIG. 2(*c*) creates the same slide operation amount, which can allow vertical distances of the A-shaft and the B-shaft at the ends correspond to a ratio of the lengths thereof, and can generate the same rotation angle θ for the A-shaft and the B-shaft within the vertical plane.

Moreover, there may be a case of using eccentric cams as described in patent documents 7 and 8 mentioned above. Also in this case, the eccentric cam for each adjustment member may be configured to generate the eccentricity amount proportional to the corresponding guide shaft length. In this manner, rotating the eccentric cam corresponding to each adjustment member for the same amount causes approximately the same rotation angle for the respective shafts within the vertical plane.

In the above-mentioned embodiments, there is no need for strict correspondence between the ratio of lengths (L1/L2) for the A-shaft and the B-shaft and the ratio of adjustment screw pitches (PA/PB), the ratio of presser foot lengths (NA/NB), or the ratio of slants (dA/dB) for the adjustment screws' tapered portions, cams, and long holes. During an adjustment operation, it just needs to ensure the same manual operation amount for the A-shaft and the B-shaft from the sensory viewpoint when commensurately operating the adjustment members for the A-shaft and the B-shaft.

According to the above-mentioned embodiments, for example, the lengths L1 and L2 of the A-shaft and the B-shaft are determined from a minimum necessary length of each guide shaft. Then, the adjustment screws' pitches PA and PB are determined so that the ratio of pitches equals the ratio of the shaft lengths. Further, it may be preferable to determine approximate lengths of guide shafts and select conventionally available screws as adjustment screws whose ratio of pitches approximates to a ratio of guide shaft lengths. Then, it may be preferable to finally determine the guide shaft lengths so as to be equal to the ratio of adjustment screw pitches.

The invention claimed is:

1. A pick-up angle adjustment apparatus for adjusting an angle of an optical pick-up mounted in an optical disk apparatus, the pick-up angle adjustment apparatus comprising:
   a first guide shaft that has a first length between a pair of ends thereof for guiding and supporting the optical pick-up;
   a second guide shaft that has a second length between a pair of ends thereof for guiding and supporting the optical pick-up, the second length being different from the first length;
   a first adjustment member that is operable for vertically moving one end of the first guide shaft so as to adjust the angle of the optical pick-up, the first adjustment member being capable of moving the one end of the first guide shaft by a first distance when the first adjustment member is operated by a given operation amount; and
   a second adjustment member that is operable for vertically moving one end of the second guide shaft so as to adjust the angle of the optical pick-up, the second adjustment member being capable of moving the one end of the second guide shaft by a second distance when the second adjustment member is operated by the same operation amount as applied to the first adjustment member, wherein a distance ratio of the first distance and the second distance is set equal to a length ratio of the first length and the second length.

2. The pick-up angle adjustment apparatus according to claim 1, wherein the first adjustment member comprises a first adjustment screw that has a first pitch and is rotatable for vertically moving one end of the first guide shaft in proportion to the first pitch, the first adjustment screw being capable of moving the one end of the first guide shaft by the first distance when the first adjustment screw is rotated by a given rotational operation amount, and
   the second adjustment member comprises a second adjustment screw that has a second pitch and is rotatable for vertically moving one end of the second guide shaft in proportion to the second pitch, the second adjustment screw being capable of moving the one end of the second guide shaft by the second distance when the second adjustment screw is rotated by the same rotational operation amount as applied to the first adjustment screw, wherein a pitch ratio of the first pitch and the second pith is set equal to the distance ratio and therefore equal to the length ratio.

3. The pick-up angle adjustment apparatus according to claim 1, wherein the first adjustment member comprises a first adjustment cam that is rotatable for converting a rotational movement thereof into a vertical movement of one end of the first guide shaft by a first conversion rate, the first adjustment cam being capable of moving the one end of the first guide shaft by the first distance when the first adjustment cam is rotated by a given rotational operation amount, and
   the second adjustment member comprises a second adjustment cam that is rotatable for converting a rotational movement thereof into a vertical movement of one end of the second guide shaft by a second conversion rate, the second adjustment cam being capable of moving the one end of the second guide shaft by the second distance when the second adjustment cam is rotated by the same rotational operation amount as applied to the first adjustment cam, wherein a conversion ratio of the first conversion rate and the second conversion rate is set equal to the distance ratio and therefore equal to the length ratio.

4. The pick-up angle adjustment apparatus according to claim 1, wherein the first adjustment member comprises a first adjustment slider that has a first slanted hole for receiving therein one end of the first guide shaft and that is slidable for vertically moving the one end of the first guide shaft along the first slanted hole, the first adjustment slider being capable of moving the one end of the first guide shaft by the first distance when the first adjustment slider is slid by a given slide operation amount, and
   the second adjustment member comprises a second adjustment slider that has a second slanted hole for receiving therein one end of the second guide shaft and that is slidable for vertically moving the one end of the second guide shaft along the second slanted hole, the second adjustment slider being capable of moving the one end of the second guide shaft by the second distance when the second adjustment slider is slid by the same slide operation amount as applied to the first adjustment slider, wherein a slant ratio of the first slanted hole and the second slanted hole is set equal to the distance ratio and therefore equal to the length ratio.

5. The pick-up angle adjustment apparatus according to claim 1, wherein the first adjustment member comprises a first adjustment holder that has a first span between a supporting point and a holding point for holding one end of the first guide shaft and that is swingable around the supporting point for vertically moving the one end of the first guide shaft at the holding point, the first adjustment holder being capable of moving the one end of the first guide shaft by the first distance when the first adjustment holder is swung by a given swing operation amount, and
   the second adjustment member comprises a second adjustment holder that has a second span between a supporting point and a holding point for holding one end of the second guide shaft and that is swingable around the supporting point for vertically moving the one end of the second guide shaft at the holding point, the second adjustment holder being capable of moving the one end of the second guide shaft by the second distance when the second adjustment holder is swung by the same swing operation amount as applied to the first adjustment holder, wherein a span ratio of the first span of the first adjustment holder and the second span of the second adjustment holder is set equal to the distance ratio and therefore equal to the length ratio.

6. The pick-up angle adjustment apparatus according to claim 1, wherein the first adjustment member has a tapered surface of a first angle for supporting one end of the first guide shaft, and is shiftable in a horizontal direction for vertically moving the one end of the first guide shaft along the tapered surface, the first adjustment member being capable of moving the one end of the first guide shaft by the first distance when the first adjustment member is shifted by a given shift operation amount, and the second adjustment member has a tapered surface of a second angle for supporting one end of the second guide shaft, and is shiftable in a horizontal direction for vertically moving the one end of the second guide shaft along the tapered surface, the second adjustment member being capable of moving the one end of the second guide shaft by the second distance when the second adjustment member is shifted by the same shift operation amount as applied to the first adjustment member, wherein an angle ratio of the first angle and the second angle is set equal to the distance ratio and therefore equal to the length ratio.

7. The pick-up angle adjustment apparatus according to claim 1, wherein the one end of the first guide shaft is staggered from the one end of the second guide shaft, while the other end of the first guide shaft is aligned to the other end of the second guide shaft.

8. The pick-up angle adjustment apparatus according to claim 7, wherein the first guide shaft and the second guide shaft are mounted in parallel to each other for guiding the optical pick-up along the length of the first guide shaft and the second guide shaft.

9. The pick-up angle adjustment apparatus according to claim 8, wherein the first guide shaft is pivotable around the other end thereof so that the one end thereof is vertically movable and the second guide shaft is pivotable around the other end thereof so that the one end thereof is vertically movable, and wherein the same operation amount enables the first adjustment member to vertically move the one end of the first guide shaft by the first distance and enables the second adjustment member to vertically move the one end of the second guide shaft by the second distance in such a manner that the first guide shaft and the second guide shaft are kept in parallel to each other while the angle of the optical pick-up is adjusted.

10. A method of adjusting an angle of an optical pick-up mounted in an optical disk apparatus by means of a first guide shaft and a second guide shaft, the first guide shaft having a first length between a pair of ends thereof for guiding and supporting the optical pick-up, the second guide shaft having a second length between a pair of ends thereof for guiding and supporting the optical pick-up, the second length being different from the first length, the method comprising the steps of:

operating a first adjustment member by a given operation amount for vertically moving one end of the first guide shaft so as to adjust the angle of the optical pick-up, such that the first adjustment member is capable of moving the one end of the first guide shaft by a first distance when the first adjustment member is operated by the given operation amount; and operating a second adjustment member by the same operation amount as applied to the first adjustment member for vertically moving one end of the second guide shaft so as to adjust the angle of the optical pick-up, such that the second adjustment member is capable of moving the one end of the second guide shaft by a second distance, wherein a distance ratio of the first distance and the second distance is set equal to a length ratio of the first length and the second length.

* * * * *